United States Patent [19]
Koizumi et al.

[11] Patent Number: 5,982,925
[45] Date of Patent: Nov. 9, 1999

[54] METHOD OF AND APPARATUS FOR REPRODUCING COLOR FOR OUTPUT DEVICE

[75] Inventors: Taeko Koizumi; Michiko Kawano, both of Kawasaki, Japan

[73] Assignee: Fujitsu Limited, Kawasaki, Japan

[21] Appl. No.: 08/212,738

[22] Filed: Mar. 14, 1994

[30] Foreign Application Priority Data

Apr. 30, 1993 [JP] Japan ..................................... 5-104573

[51] Int. Cl.$^6$ ........................................................ H04N 1/60
[52] U.S. Cl. .......................... 382/166; 358/520; 382/167
[58] Field of Search ..................... 358/518, 520, 358/500, 501, 502, 530, 539; 382/166, 239, 167; 395/109; 348/646, 651, 703; H04N 1/60

[56] References Cited

U.S. PATENT DOCUMENTS 5,359,437  10/1994  Hibi ........................................ 358/530
5,452,017  9/1995  Hickman ................................. 358/520

*Primary Examiner*—Kim Yen Vu
*Attorney, Agent, or Firm*—Staas & Halsey

[57] ABSTRACT

An apparatus and method for reproducing a color image of an original color image. The apparatus and method produces a saturation range of color light in the original color image and reproduces a saturation range of an output device. The invention then calculates maximum saturation ranges covering the saturation range of the color light and the reproduced saturation range of the output device corresponding to each lightness. According to the maximum saturation range of the color light and the maximum reproduced saturation range of the output device corresponding to each lightness, the apparatus and method calculates a saturation compression rate for analogously compressing the saturation range of the color light into the reproducing saturation range, and performs a saturation compression on the original color image using the calculated saturation compression rate. A reproduced color image is then generated based on the performed saturation compression.

16 Claims, 13 Drawing Sheets

METHOD OF AND APPARATUS FOR REPRODUCING COLOR FOR OUTPUT DEVICE

BACKGROUND OF THE INVENTION

1. Field of the Invention

This invention relates to a method of and an apparatus for reproducing color for use by an output device such as a printer outputting an output image according to color image data. More particularly, this invention relates to a technology of reducing a colorimetric bungle between the output image outputted from the output device and the color image data inputted from a color image scanner. In other words, the technology is to match the output image of the output device with the color image data of the color image scanner.

2. Description of the Related Art

Recently, according to demands of high quality of an image for a color image medium such as TV (television), an output image from an output device corresponding to color image data, such as a printout, i.e., hard copy, of a color image from a printer, is strongly required to be higher quality. To accomplish the higher quality of the printout by the printer, it is necessary to match an output image with original color image data. The output image is, for example, a print image printed out from the printer corresponding to the color image data. The original color data are, for example, the color image data inputted from a color image scanner.

For matching color as mentioned above, a conventional printer takes a method for reproducing color as follows.

When reproducing color, the color image data to be outputted, for example, color space data supplied from a data base are processed by a predetermined color converting procedure. This color converting procedure has a compressing saturation procedure to compress a saturation into the color space data. The compressing saturation procedure produces output image data comprising a plurality of color information including cyan, magenta, and yellow to be suitable for printing by the printer. The output image data are supplied to the printer.

The compressing saturation procedure is a procedure for compressing the saturation of the color image data into a gamut of the saturation corresponding to each hue wherein the gamut of the saturation is capable of reproducing color (color representation) by the printer. That is, the compressing saturation procedure is a procedure for compressing the saturation into a reproducing saturation range. FIG. 1 shows the compressing saturation procedure in a general idea.

On the compressing saturation procedure, saturation ranges of color light in the color image data and reproducing saturation ranges of the printer are calculated. The saturation ranges of the color and the reproducing saturation ranges of the printer are stored in a memory. A required compression rate is calculated from both of the saturation ranges corresponding to each hue. Then, the compressing saturation procedure is processed with the compression rate. The result of the compression is stored in a memory for use of the color image data. The color image is outputted based on the stored data in the memory to reproduce color.

However, the saturation reproducing ranges of the printer are different from each other corresponding to each hue. Therefore, as the conventional compressing saturation procedure as described above is processed, it is possible of breaking color balance of the output image.

The saturation reproducing ranges of the printer are generally narrower than the saturation ranges of color light. In particular, the saturation reproducing ranges of the printer are remarkably narrower than the saturation ranges of color light in accordance with becoming higher lightness or lower lightness. Therefore, in the case of the color image data which have a wider range of the lightness, the image must have subdued colors lacking of vividness.

SUMMARY OF THE INVENTION

It is an object of the present invention to provide a method of and an apparatus for reproducing color for use by an output device, which is capable of outputting color image data in suitable color and in good color balance within a required reproducing color range even if the output device has a narrow color reproducible range and unbalanced distribution of reproducing color range in accordance with hues.

An apparatus for reproducing color of an output device according to the present invention comprises a saturation range calculating section, a compressing rate calculating section, and a compression arithmetic section.

The saturation range calculating section calculates saturation ranges of color light in a color image data and reproducing saturation ranges in which the output device is capable of reproducing color so as to calculate (maximum) saturation ranges which are able to cover the saturation ranges of color light and the reproducing saturation ranges of the output device at each predetermined lightness range, respectively.

According to the saturation ranges and the reproducing saturation ranges of the output device corresponding to each lightness range which are calculated by the saturation range calculating section, the compression rate calculating section calculates a compressing saturation rate for analogously compressing the saturation ranges of color light into the reproducing saturation ranges of the output device.

The compression arithmetic section performs the saturation compression on the color image data by the compressing saturation rate calculated by the compressing rate calculating section to output the compressed image data to the output device.

The output device is, for example, a color printer, a display device or the like. Because the color printer is inputted by output image data comprising a plurality of color information, e.g., cyan, magenta and yellow information, the above mentioned apparatus for reproducing color performs color conversion the color image data processed by the saturation compression as mentioned above into the output image data.

The saturation range calculating section, the compression rate calculating section, and the compression arithmetic section may be functions each of which is accomplished by a software and an inner arithmetic circuit with including a CPU having a microprocessor.

The apparatus for reproducing color may comprise a lightness distribution calculating section, a lightness discriminating section, a transfer rate calculating section, and a lightness transfer section.

The lightness distribution calculating section calculates a lightness distribution of the color image data.

According to the lightness distribution calculated by the lightness distribution calculating section, the lightness discriminating section discriminates whether a main lightness is a lightness which the reproducing saturation range of the output device has a small value or not. In the apparatus for reproducing color, when the main lightness is the first lightness range which the reproducing saturation range of the output device has a small value, the main lightness range is shifted to a second lightness range which the reproducing saturation range of the output device has a large value. The lightness discriminating section discriminates whether the lightness transfer as mentioned above must be performed or not.

The transfer rate calculating section calculates a lightness transfer rate according to the first lightness range and the second lightness range when the lightness transfer is performed by the lightness discriminating section.

The lightness transfer section performs lightness transfer on the color image data by the lightness transfer rate calculated by the transfer rate calculating section. In this case, the compression arithmetic section performs the saturation compression on the color image data performed by the lightness transfer in the lightness transfer section.

Furthermore, the apparatus for reproducing color may comprise first image data storing section, second image data storing section, a lightness distribution storing section, and a lightness transfer storing section.

The first image data storing section stores the original color image data (not performed by the lightness transfer). This color image data are supplied to the lightness distribution calculating section. The lightness distribution storing section stores a lightness distribution produced by the lightness distribution calculating section. This lightness distribution is supplied to the lightness discriminating section. The lightness transfer rate storing section stores a lightness transfer rate produced by the transfer rate calculating section. This lightness transfer rate is supplied to the lightness transfer section. The second image data storing section stores a color image data performed by the lightness transfer in the lightness transfer section.

These storing sections may disposed in the same memory.

The lightness discriminating section may have a lightness detecting section and a compression rate detecting section.

According to the lightness distribution, the lightness detecting section detects a lightness range having a high frequency lightness value and a lightness value disposed contiguous to the high frequency lightness value, wherein the high frequency lightness value is a lightness value which is distributed much. The lightness range detected by the lightness detecting section is an object for discriminating the lightness and for transferring the lightness. According to the lightness range detected by the lightness detecting section and the saturation compression rate calculated by the compression rate calculating section, the compression rate detecting section detects that the saturation compression rate corresponding to the lightness range is below a predetermined threshold.

The transfer rate calculating section may have a shift direction determining section and a shift rate calculating section.

According to the reproducing saturation range calculated by the saturation calculating section, the shift direction determining section determines whether the lightness range of the lightness distribution is shifted in a positive direction or in a negative direction. The shift rate calculating section calculates a shift rate in the positive direction or in the negative direction of the lightness range according to a maximum value and a minimum value of the lightness value. This shift rate is the lightness transfer rate.

The shift direction determining section determines a shift direction of the lightness range by comparing a reproducing saturation range (of the output device) which is one unit, for example, one block upper from the lightness range with a reproducing saturation range of the output device which is one block lower from the lightness range.

The apparatus for reproducing color of the present invention calculates saturation ranges of color light and reproducing saturation ranges of the output device and then calculates maximum saturation ranges covering the saturation ranges of color light and the reproducing saturation ranges of the output device at each predetermined lightness range, respectively. According to the saturation ranges and reproducing saturation ranges of the output device at each predetermined lightness range which are calculated as mentioned above, the saturation compression rate for analogously compressing the maximum saturation range of color light into the maximum reproducing saturation range of the output device. The saturation compression is performed on the color image data by the saturation compression rate.

Thus, the apparatus for reproducing color of the output device performs the saturation compression by analogously compressing without deforming a saturation pattern, taking the saturation ranges of color light and the reproducing saturation ranges of the output device into consideration so that the apparatus is capable of maintaining a color balance on the output image even if the saturation of the output image is compressed.

The lightness distribution of the color image data is calculated. It is determined whether the lightness transfer is performed or not according to this lightness distribution, wherein the lightness transfer shifts the first lightness range which the reproducing saturation ranges of the output device has a small value to the second lightness range which the reproducing saturation ranges has a large value. When it is determined that the lightness transfer is performed, the lightness transfer is performed on the color image data by the lightness transfer rate.

When the reproducing saturation range of the output device has a small value, the lightness transfer is performed so as to make the reproducing saturation range larger corresponding to the lightness distribution of the color image data, and the saturation compression is then performed. Therefore, the apparatus for reproducing color is able to output more vivid and beautiful output image from the output device with effectively using the reproducing color ranges of the output device.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Referring to attached figures, embodiments according to the present invention will now be described hereinafter.

[First Embodiment]

Figure 1:
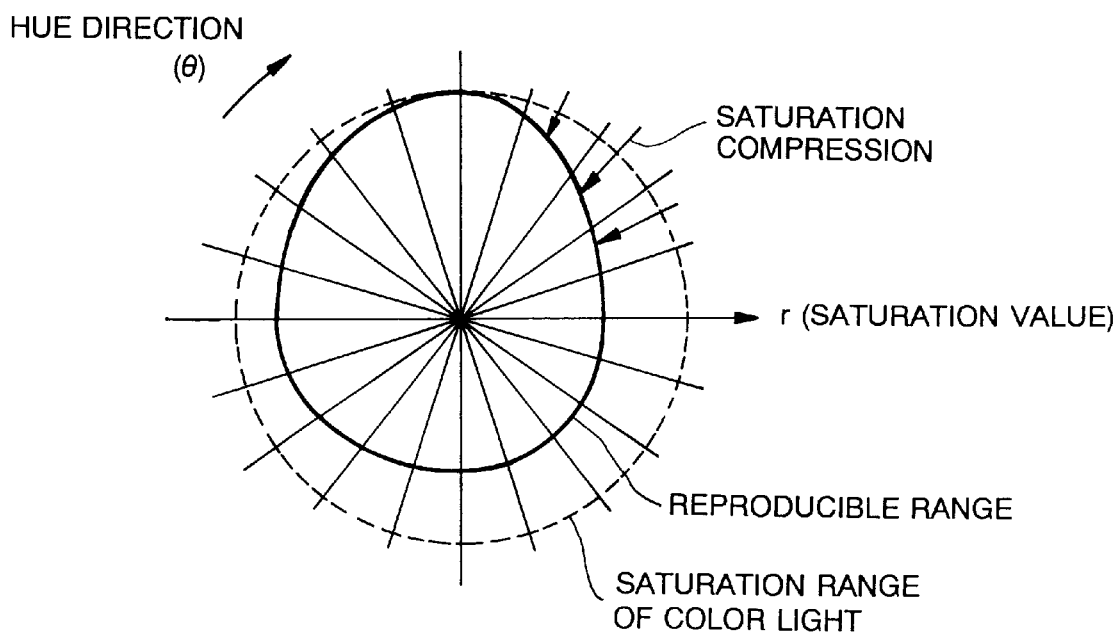
FIG. 1 is an exemplified diagram for use in describing a concept of a conventional saturation compression.
Figure 2:
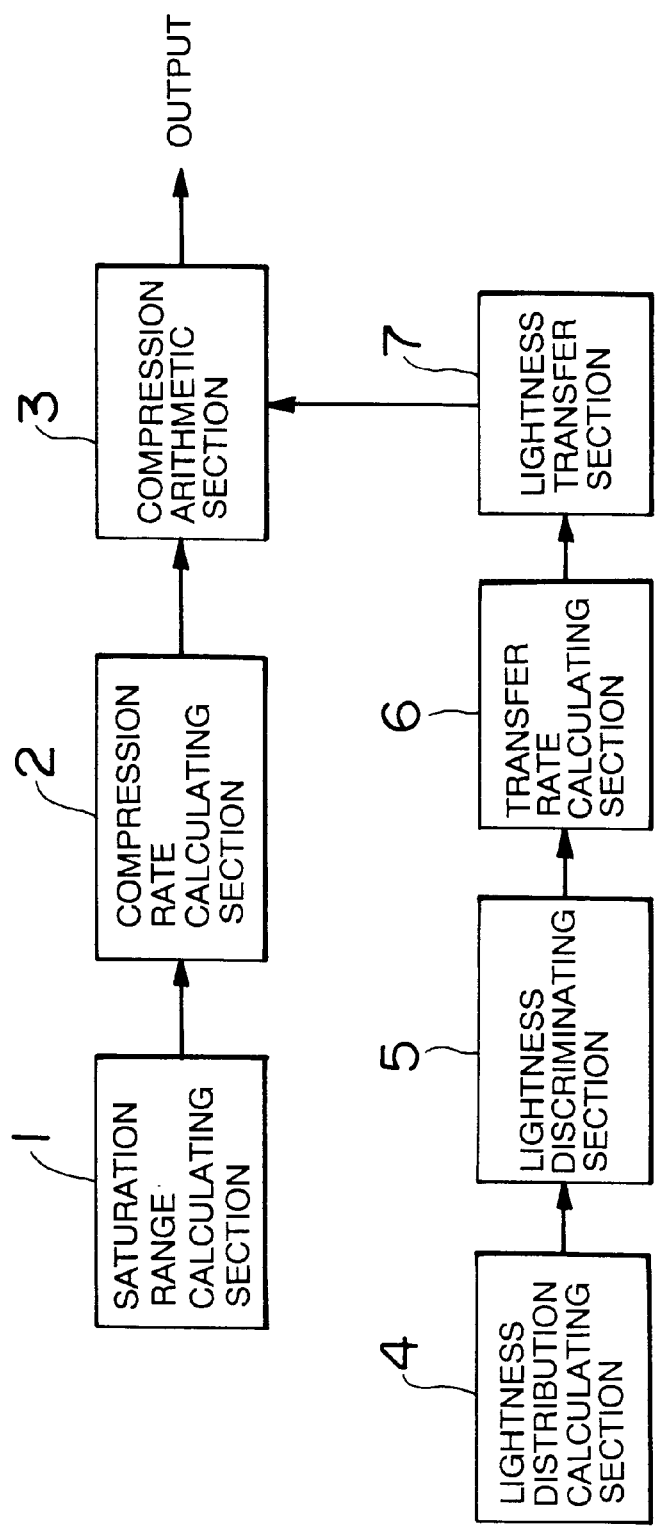
FIG. 2 is a principle block diagram showing a structure of an apparatus for reproducing color in use of the output device according to a first embodiment of the present invention.

FIG. 2 shows a principle structure of an apparatus for reproducing color in use of an output device according to a first embodiment of the present invention. The apparatus shown in FIG. 2 in use of the output device processes a converting color procedure corresponding to original color image data to be outputted to supply output image data to the output device (not shown in FIG. 2). The output device may be a printer, a display unit or the like.

Since the output device such as a printer is generally stored the output image data corresponding to a predetermined color coordinate space to output a color image, the apparatus for reproducing color of the output device according to the present invention performs a color-conversion on the supplied original color image data to the predetermined output image data to be outputted.

The apparatus for reproducing color shown in FIG. 2 comprises a saturation range calculating section 1, a compression rate calculating section 2, a compression arithmetic section 3, a lightness distribution calculating section 4, a lightness discriminating section 5, a transfer rate calculating section 6, and a lightness transfer section 7.

The saturation range calculating section 1 calculates color gamuts or saturation ranges of color light in the original color image data and reproducing color gamuts or saturation ranges of the output device and then calculates maximum saturation ranges covering the saturation ranges of color light and the reproducing saturation ranges of the output device at each predetermined lightness range, respectively.

According to the maximum saturation range of color light and the maximum reproducing saturation range of the output device which are calculated by the saturation range calculating section 1 corresponding to each predetermined lightness range, the compression rate calculating section 2 calculates a saturation compression rate being necessary for analogously compressing so as to correspond the maximum saturation range of color light to the maximum reproducing saturation range of the output device.

The compression arithmetic section 3 compresses the saturation of the original color image data with the saturation compression rate calculated by the compression rate calculating section 2.

The lightness distribution calculating section 4 calculates a lightness distribution of the original color image data.

The lightness discriminating section 5 detects a main lightness, that is, a lightness distributed much according to the lightness distribution calculated by the lightness distribution calculating section 4 and discriminates whether the main lightness is a first lightness range which the reproducing saturation ranges of the output device has a small value or not. Concretely, when the main lightness is the first lightness range which the reproducing saturation ranges of the output device has a small value, the lightness transfer is performed so that the lightness range is shifted to a second lightness range which the reproducing saturation range of the output device has a large value. The lightness discriminating section 5 determines whether the lightness transfer as mentioned above is performed or not.

As the lightness discriminating section 5 determines that the lightness transfer is performed, the transfer rate calculating section 6 calculates a lightness transfer rate according to the first lightness range and the second lightness range.

The lightness transfer section 7 performs the lightness transfer on the color image data with the lightness transfer rate calculated by the transfer rate calculating section 6. The compression arithmetic section 3 performs a saturation compression on the color image data which the lightness transfer is performed by the lightness transfer section 7.

The saturation range calculating section 1, the compression rate calculating section 2, and the compression arithmetic section 3 are functions each of which is accomplished by a software and an arithmetic circuit with CPU having a microprocessor. Furthermore, the saturation range calculating section 1, the compression rate calculating section 2, and the compression arithmetic section 3 may consists of concrete circuits individually having an arithmetic circuit, respectively.

Figure 3:
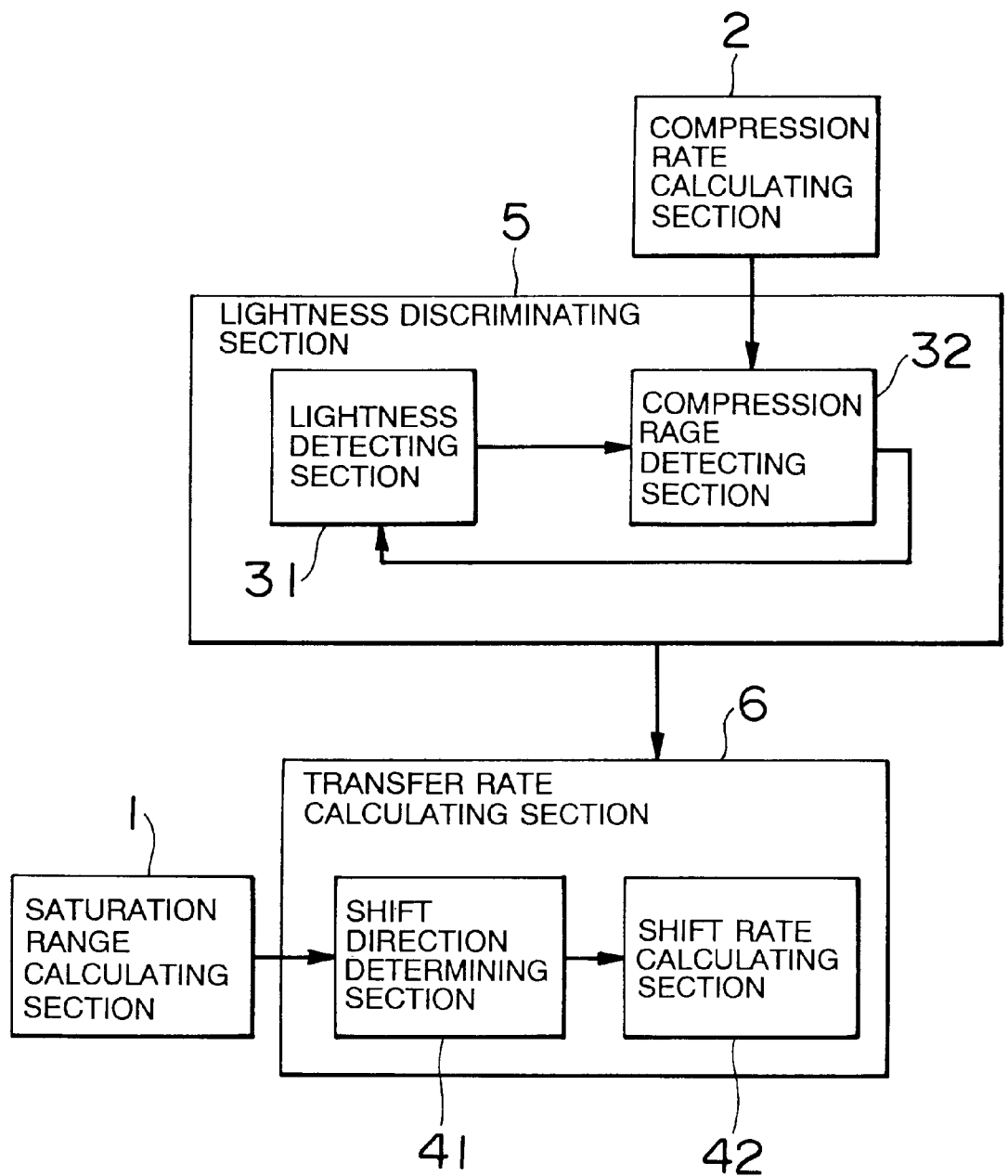
FIG. 3 is a block diagram showing a detailed structure of a lightness discriminating section and a transfer rate calculating section of the apparatus shown in FIG. 2.

FIG. 3 shows more detailed structures of the lightness discriminating section 5 and the lightness transfer rate calculating section 6 shown in FIG. 2.

The lightness discriminating section 5 shown in FIG. 3 comprises a lightness detecting section 31 and a compression rate detecting section 32.

According to the lightness distribution as mentioned above, the lightness detecting section 31 detects a lightness range having a high frequency lightness value and a lightness value disposed contiguous to the high frequency lightness value, wherein the high frequency lightness value is a lightness value which is distributed much. The lightness range detected by the lightness detecting section 31 is an object for discriminating the lightness and for transferring the lightness. According to the lightness range detected by the lightness detecting section 31 and the saturation compression rate calculated by the compression rate calculating section, the compression detecting section 32 detects that the saturation compression rate corresponding to the lightness range is below a predetermined threshold. When the saturation compression rate corresponding to the lightness range is below the predetermined threshold, the lightness transfer section 7 transfers the lightness.

The compression rate detecting section 32 detects the compression rate above mentioned, for example, by comparing the saturation compression rate with the predetermined threshold corresponding to each lightness value included in the lightness range.

The transfer rate calculating section 6 shown in FIG. 3 comprises a shift direction determination section 41, and a shift rate calculating section 42.

According to the reproducing saturation range calculated by the saturation calculating section 1, the shift direction determination section 41 determines whether the lightness range of the lightness distribution is shifted in a positive direction or in a negative direction. The shift rate calculating section 42 calculates a shift rate in the positive direction or in the negative direction of the lightness range according to a maximum value and a minimum value of the lightness value. This shift rate is the lightness transfer rate.

The shift direction determining section 41 determines a shift direction of the lightness range by comparing a reproducing saturation range of the output device which is one block upper from the lightness range with a reproducing saturation range of the output device which is one block lower from the lightness range.

Figure 4:
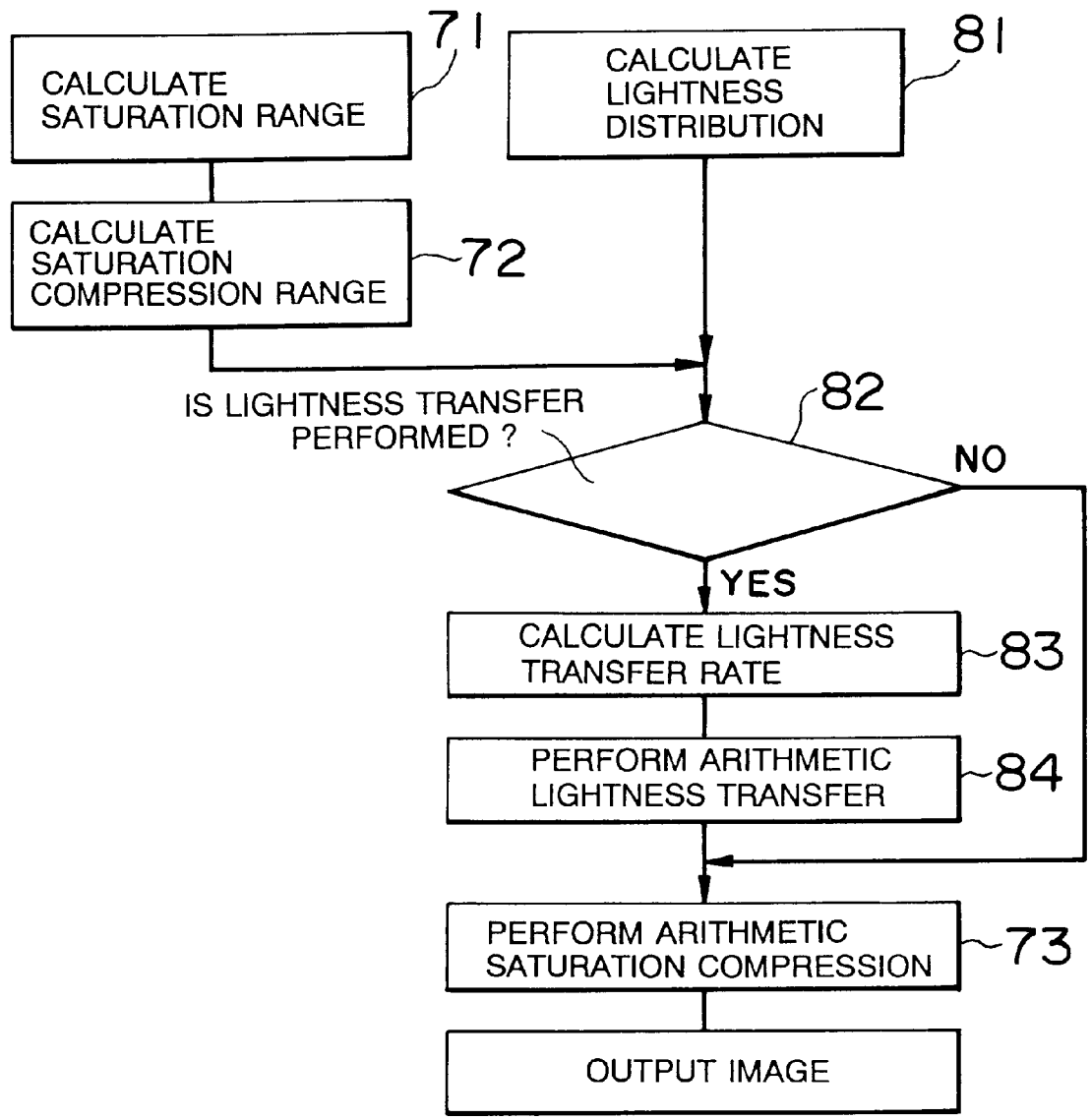
FIG. 4 is an flow chart for use in describing operation of the apparatus shown in FIG. 2.

FIG. 4 is a flow chart showing an operational principle of the apparatus for reproducing color in use of the output device shown in FIGS. 2 and 3.

First, the saturation range calculating section 1 calculates the saturation ranges of color light in the original color image data and the reproducing saturation ranges of the printer and then calculates the maximum saturation range covering the saturation ranges of color light and the maximum reproducing saturation range covering the reproducing saturation ranges of the output device corresponding to each lightness range (Step 71).

According to the maximum saturation range and the maximum reproducing saturation range of the output device which are calculated by Step 71 corresponding to each the predetermined lightness range, the compression rate calculating section 2 calculates the saturation compression rate for analogously compressing the maximum saturation range of color light into the maximum reproducing saturation range of the output device (Step 72).

While, the lightness distribution calculating section 4 calculates the lightness distribution of the original color image data (Step 81).

According to the lightness distribution calculated by Step 81, the lightness discriminating section 5 discriminates whether the main lightness is a lightness which the reproducing saturation range of the output device has a small value or not (Step 82). In the apparatus for reproducing color, when the main lightness is the first lightness range which the reproducing saturation range of the output device has a small value, the lightness transfer is performed so that the lightness range is shifted to a second lightness range which the reproducing saturation range of the output device has a large value. Step 82 determines whether the lightness has to be transferred as mentioned above or not.

In Step 82, according to the lightness distribution as mentioned above, the lightness detecting section 31 detects a lightness range having a lightness value disposed contiguous to the high frequency lightness value, wherein the high frequency lightness value is a lightness value which is distributed much. This lightness range is an object for discriminating the lightness and for transferring the lightness. Furthermore, according to the lightness detected by the lightness detecting section 31 and the saturation compression rate calculated by Step 72, the compression rate detecting section 32 detected that the saturation compression rate corresponding to the lightness range is below the predetermined threshold. When the saturation compression rate is below the predetermined threshold, the lightness transfer is performed.

In Step 82, as the lightness discriminating section 5 determines that the lightness transfer is performed, the transfer rate calculating section 6 calculates a lightness transfer rate according to the first lightness range and the second lightness range (Step 83). In Step 83, the shift direction determination section 41 determines a shift direction with regard to the saturation range calculated by Step 71 and the shift rate calculating section 42 calculates a shift rate, that is, the lightness transfer rate.

The lightness transfer section 7 performs lightness transfer arithmetic on the original color image data by the lightness transfer rate calculated by the shift rate calculating section 42 (Step 84).

The compression arithmetic section 3 performs the saturation compression on the color image data by the saturation compression rate calculated by the compression rate detecting section 32 (Step 73).

In Step 73, when the lightness transfer is performed, Step 84 performs the saturation compression on the color image data on which the lightness transfer is performed. When the lightness transfer is not performed, the saturation compression is performed on the original color image data.

An image is outputted through the result of the saturation compression arithmetic in Step 73.

Thus, the apparatus for reproducing color of the output device performs the saturation compression by analogously compressing without breaking a saturation pattern, taking the saturation ranges of color light and the reproducing saturation ranges of the output device into consideration so that the apparatus is capable of keeping a color balance on the output image even if the saturation of the output image is compressed.

When the reproducing saturation range of the output device has a small value, the lightness transfer is performed so as to make the reproducing saturation range larger corresponding to the lightness distribution of the color image data, then, the saturation compression is performed. Therefore, the apparatus for reproducing color is able to output more vivid and beautiful output image from the output device with effectively using the reproducing color ranges of the output device.

[Second Embodiment]

Figure 5:
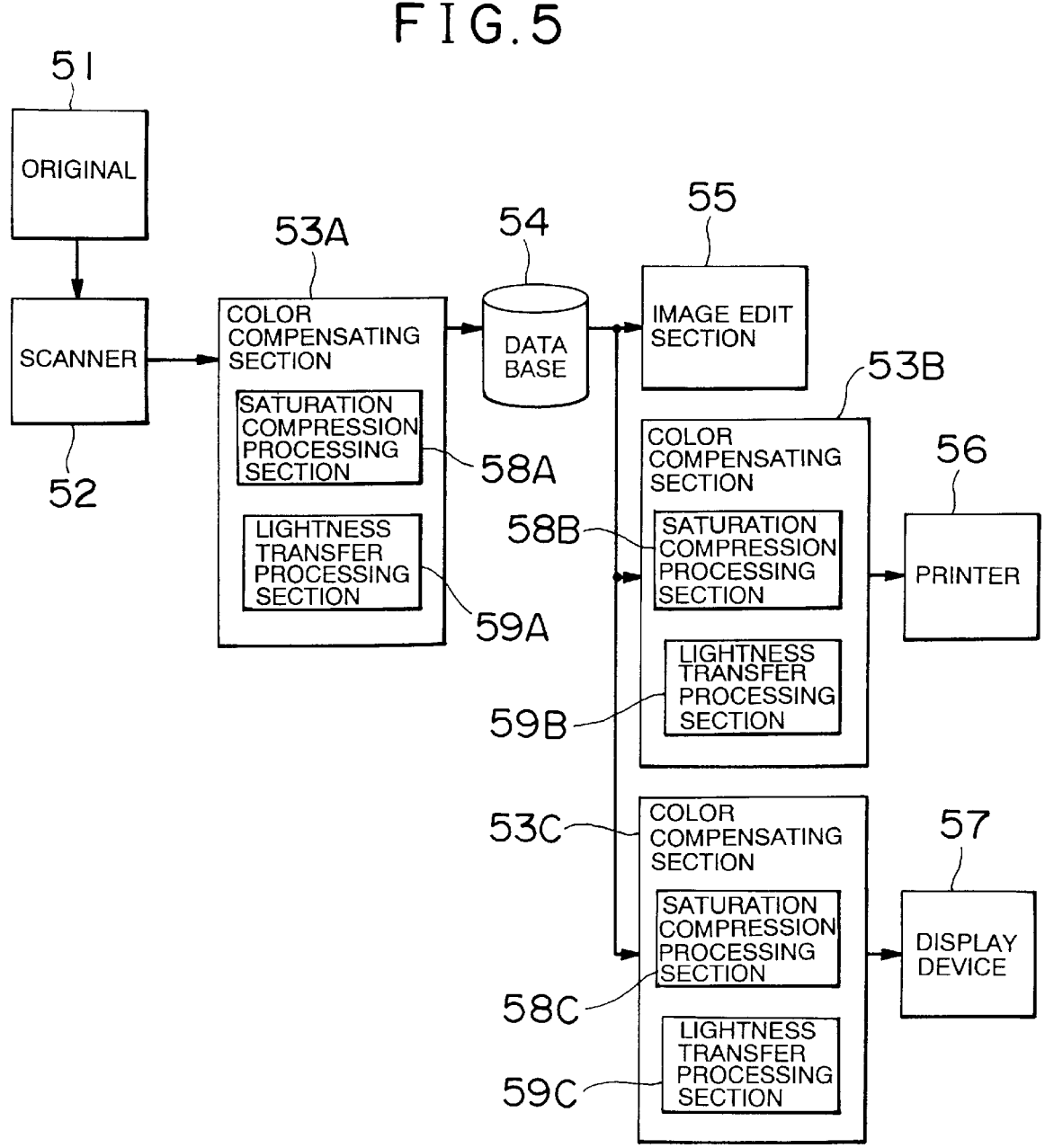
FIG. 5 is a structure including an apparatus for reproducing color in use of an output device according to a second embodiment of the present invention.

FIG. 5 shows a concrete structure of a image output system including an apparatus for reproducing color of an output device according to a second embodiment of the present invention. FIG. 5 shows the structure in case of a printer is used as an output device.

The system shown in FIG. 5 comprises a scanner 52, color compensation sections 53A, 53B, 53C, a data base 54, an image edit section 55, a printer 56, and a display section 57. The color compensation sections 53A, 53B, and 53C have saturation compression processing sections 58A, 58B, and 58C and lightness transfer processing sections 59A, 59B, and 59C, respectively.

The scanner 52 may be color image scanner or the like. The scanner 52 scans and images an original 51 as a subject to receive original color image data comprising RGB data of red, green, and blue. The original color image data received by scanner 52 are supplied to the first color compensation processing section 53A.

The color compensation processing section 53A is disposed between the scanner 52 and the data base (DB) 54 and performs a color compensation so as to convert RGB data received from the scanner 52 to a color space of image data stored in the data base 54.

The color space of image data in the data base 54 is, for example, an uniform perceptual space which matches human visual sense very well. In this case, spaces L* a* b* in color coordinate system L* a* b* are used as the uniform perceptual space.

Color spaces L* u* v* may also be used as the uniform perceptual space.

The data base 54 is connected to the image edit section 55, the second and third color compensation processing section 53B and 53C.

The image edit section 55 fetches the image data from the data base 54 to suitably edit as the occasion demands. The color compensation processing section 53B performs color compensation so as to convert the original color image data fetched from the data base 54 to an output image data being suitable for printout of the printer 54.

The color compensation processing section 53C performs color compensation so as to convert the original color image data fetched from the data base 54 to RGB data being suitable for the display section 57.

The color compensation processing sections 53A, 53B, and 53C have the saturation compression processing sections 58A, 58B, and 58C and the lightness transfer processing sections 59A, 59B, and 59C, respectively to perform color compensation on the data.

The saturation compression processing sections 58A, 58B, and 58C perform compression processes on the saturation and the lightness transfer processing section 59A, 59B, and 59C transfer the lightness to a suitable lightness.

Figure 6:
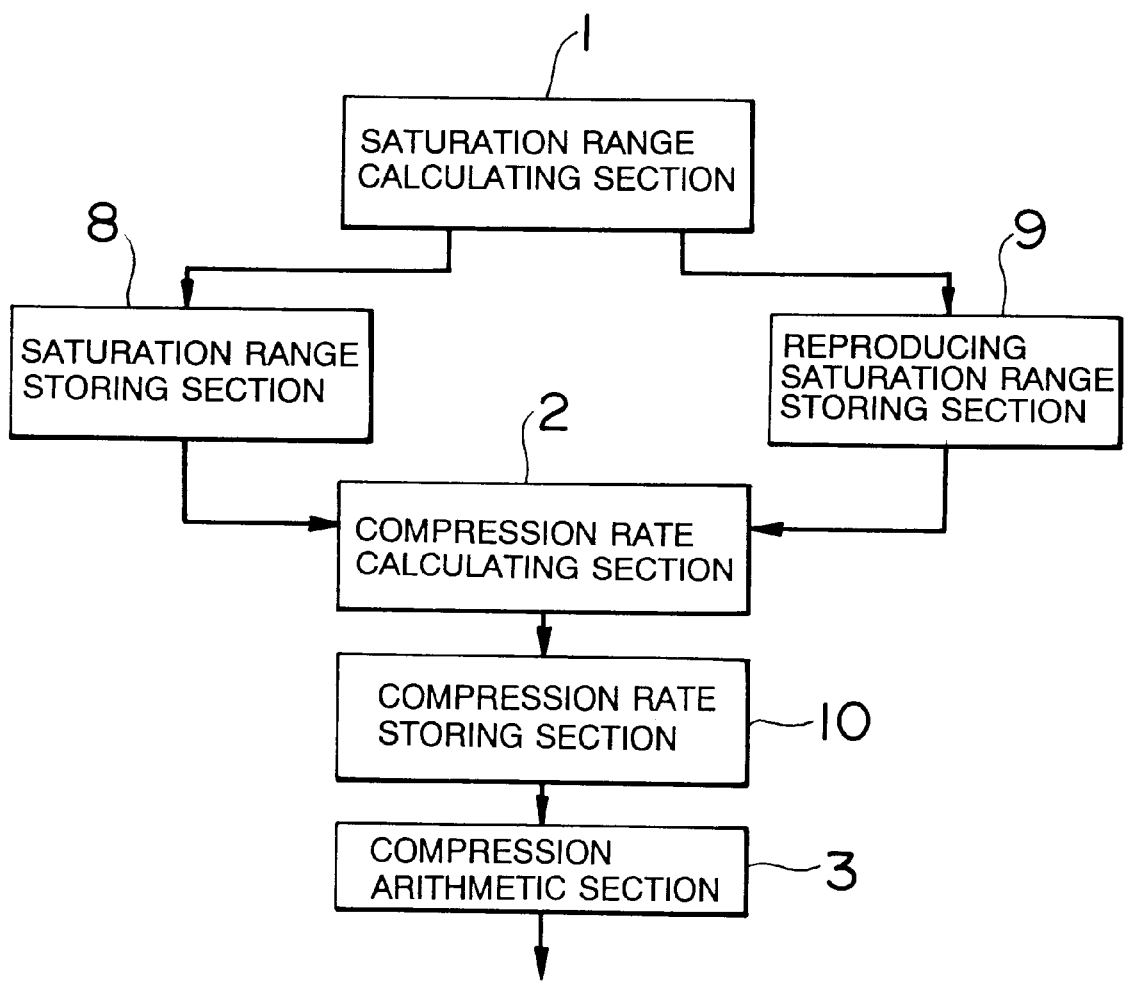
FIG. 6 is a block diagram showing a detailed structure of a compressing saturation processing section within a color compensating section in the system shown in FIG. 5.

FIG. 6 shows structures of the saturation compression processing sections 58A, 58B, and 58C, respectively.

The saturation compression processing sections 58A, 58B, and 58C have a saturation range calculating section 1, a compression rate calculating section 2, a compression arithmetic section 3, a saturation range storing section 8, a reproducing saturation range storing section 9, and a compression rate storing section 10.

With regard to spaces L* a* b*, a lightness L* is set to a vertical axis and lightness a* b* are set to a surface at right angles to the vertical axis, that is, a surface which the vertical axis crosses perpendicularly.

The saturation range calculating section 1 calculates a maximum saturation range corresponding to each lightness by calculating a saturation ranges of color light and a reproducing saturation ranges of the printer 56. The saturation ranges calculated by the saturation range calculating section 1 are stored in the saturation range storing section 8 and the reproducing saturation range storing 9.

The saturation range storing section 8 stores the saturation ranges of color light as first data corresponding to each lightness. The reproducing saturation range storing section 9 stores the reproducing saturation ranges of the printer 56 as second data corresponding to each lightness.

According to the first data stored in the saturation range storing section 8 and the second data stored in the reproducing saturation range storing section 9, the compression rate calculating section 2 calculates the saturation compression rate corresponding to each lightness. The saturation compression rate calculated by the compression rate calculating section 2 are stored in the compression rate storing section 10.

The saturation compression arithmetic section 3 reads our the saturation compression rate calculated by the compression rate calculating section 2 performs the saturation compression on the color image data by the saturation compression rate.

Figure 7:
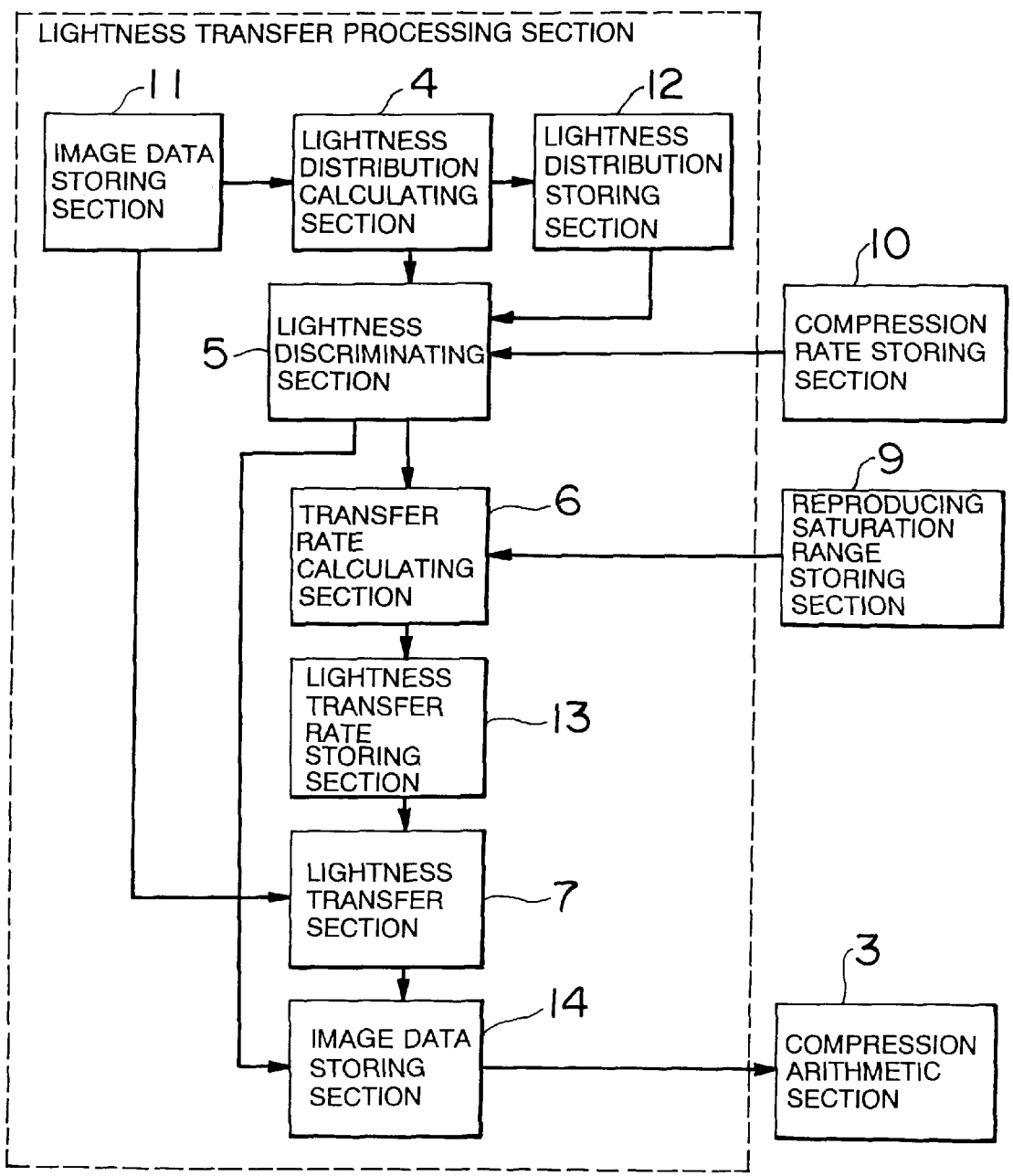
FIG. 7 is a block diagram showing a detailed structure of an transferring lightness processing section within the color compensating section in the system shown in FIG. 5.

FIG. 7 shows a concrete structure of the lightness transfer processing section 59A, 59B, or 59C (the structures of these lightness transfer processing sections 59A, 59B, and 59C are substantially same).

The lightness transfer processing section shown in FIG. 7 comprises the lightness distribution calculating section 4, the lightness discriminating section 5, the transfer rate calculating section 6, the lightness transfer section 7, image data storing sections 11, 14, a lightness distribution storing section 12, and a lightness transfer rate storing section 13.

The image data storing section 11 stores the image data L* a* b* as the original color image data.

The lightness distribution calculating section 4 calculates a distribution of the lightness (L*) corresponding to whole image data of the image data L* a* b* read out from the image data storing section 11. The lightness distribution storing section 12 stores the result for output of the lightness distribution calculating section 4.

According to the lightness distribution stored in the lightness distribution storing section 12 and the saturation compression rate corresponding to each lightness stored in the compression rate storing section 10, the lightness discriminating section 5 determines whether the lightness transfer is performed or not.

Figure 8:
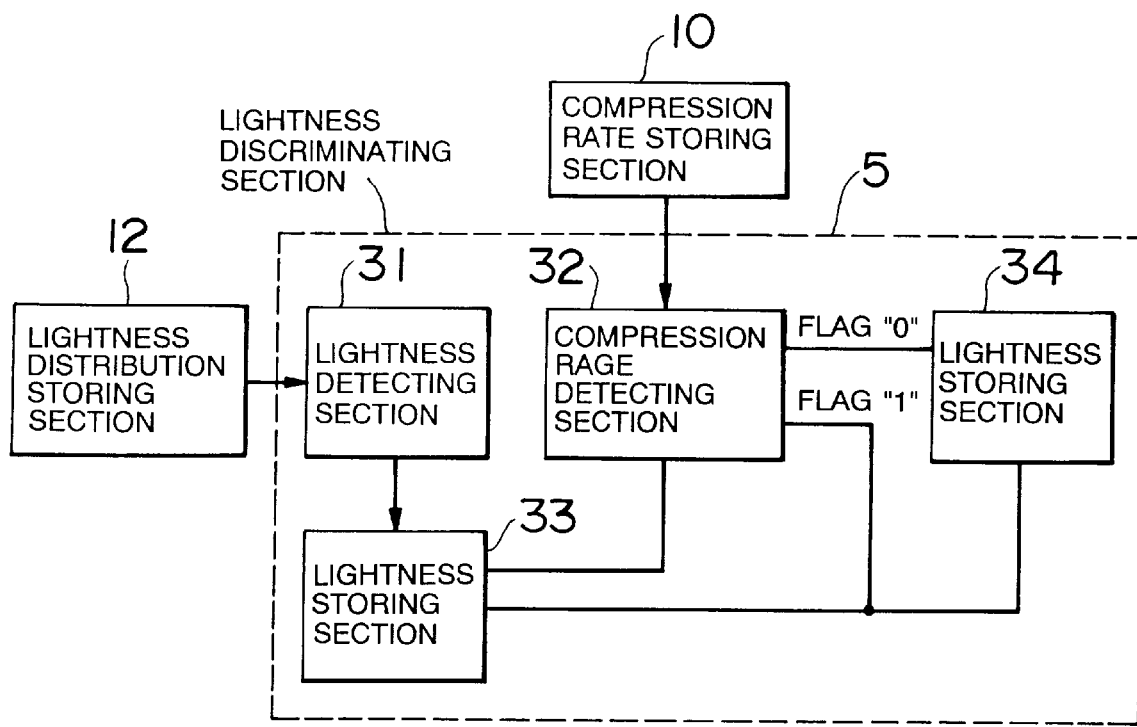
FIG. 8 is a block diagram showing a detailed structure of a lightness discriminating section shown in FIG. 5.

FIG. 8 shows a detailed structure of the lightness discriminating section 5. The lightness discriminating section 5 shown in FIG. 8 comprises the lightness detecting section 31 and the compression rate detecting section 32, and lightness storing sections 33 and 34.

The lightness detecting section 31 detects a high frequency lightness value according to the lightness distribution stored in the lightness distribution storing section 12, wherein the high frequency lightness value is a lightness value which is distributed much, and then produces the lightness range comprising the high frequency lightness value and the lightness value disposed contiguous to the high frequency lightness value. The lightness range is an object for discriminating the lightness and for transferring the lightness.

The lightness range outputted from the lightness detecting section 31 as an object-lightness range is stored in the lightness storing section 33.

According to the lightness value stored in the lightness storing section 33 and the high frequency lightness stored in the compression rate storing section 10, the compression rate detecting section 32, the compression rate detecting section 32 performs the lightness transfer (Flag "0") when the saturation compression rate is smaller than the predetermined threshold, and does not perform the lightness transfer (Flag "1") when the saturation compression rate is lager than the predetermined threshold.

In setting the flag, Flag "1" may be set when the lightness transfer is performed and Flag "0" may be set when the lightness transfer is not performed.

The compression rate detecting section 32 repeatedly performs the above mentioned process at the number of times which is the same to the number of lightness values stored in the lightness storing section 33.

The lightness storing section 34 stores the object-lightness range including the lightness values when the lightness transfer is performed (Flag "0").

The lightness transfer rate calculating section 6 calculates the lightness transfer rate only when the lightness discriminating section 5 determines that the flag is Flag "0".

Figure 9:
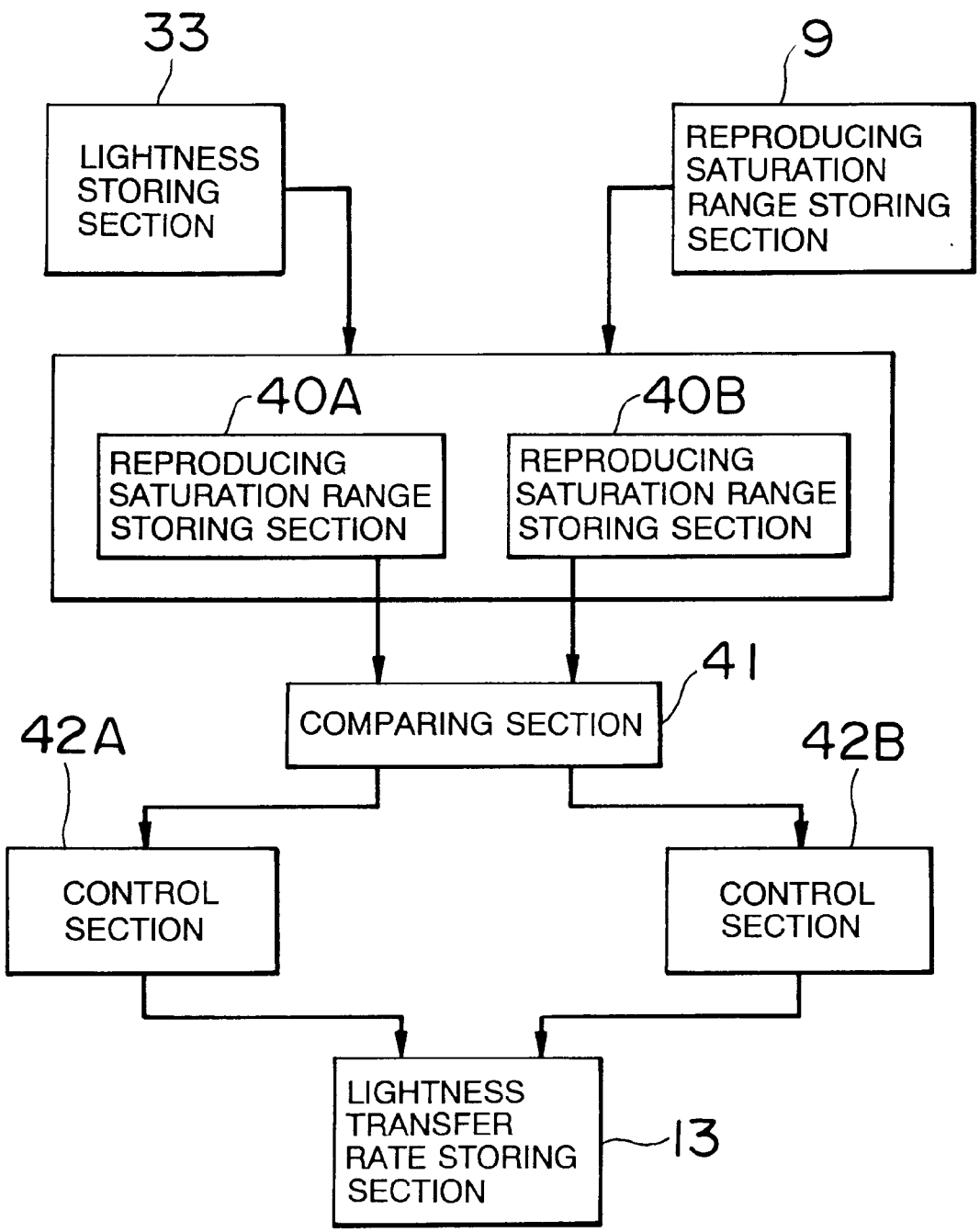
FIG. 9 is a block diagram showing a detailed structure of a transfer rate calculating section shown in FIG. 7.

FIG. 9 shows the detailed structure of the lightness transfer calculating section 6.

The lightness transfer calculating section 6 shown in FIG. 9 has reproducing saturation range storing sections 40A, 40B, a comparing section 41, and control section 42A, 42B.

According to the reproducing saturation range of the printer stored in the reproducing saturation range storing section 9, the reproducing saturation range storing section 40A stores the reproducing saturation range of the printer corresponding to a lightness range which is one block (1 unit) upper from the lightness range stored in the lightness storing section 34.

According to the reproducing saturation range of the printer stored in the reproducing saturation range storing section 9, the reproducing saturation range storing section 40B stores the reproducing saturation range of the printer corresponding to a lightness range which is one block lower from the lightness range stored in the lightness storing section 34.

The comparing section 41 compares the reproducing saturation range of printer stored in the reproducing saturation range storing section 40A with the reproducing saturation range of printer stored in the reproducing saturation range storing section 40B.

The control section 42A calculate a shift rate of one block in a positive direction of the lightness in the object-lightness range stored in the lightness storing section 34 when the reproducing saturation range of printer stored in the reproducing saturation range storing section 40A is larger (Flag "0"). The lightness transfer rate storing section 13 stores the lightness transfer rate calculated above.

The control section 42B calculate a shift rate of one block in a negative direction of the lightness in the object-lightness range stored in the lightness storing section 34 when the reproducing saturation range of printer stored in the reproducing saturation range storing section 40B is larger (Flag "1").

According to the lightness transfer rate calculated above, the lightness transfer section 7 performs the lightness transfer on the lightness data which is determined that the lightness transfer is performed within the image data stored in the image data storing section 11.

The image data storing section 14 stores the image data to be outputted from the lightness transfer section 7 wherein the image data are performed by the lightness transfer. The saturation compression arithmetic section 3 performs the saturation compression on the image data performed by the lightness transfer in the lightness transfer section 7 and then produces final output image data performed by the color compensating procedure.

[Process of the Second Embodiment]

In reproducing color of the image output system as mentioned above, the saturation compression procedure will now be concretely described hereinafter.

Figure 10:
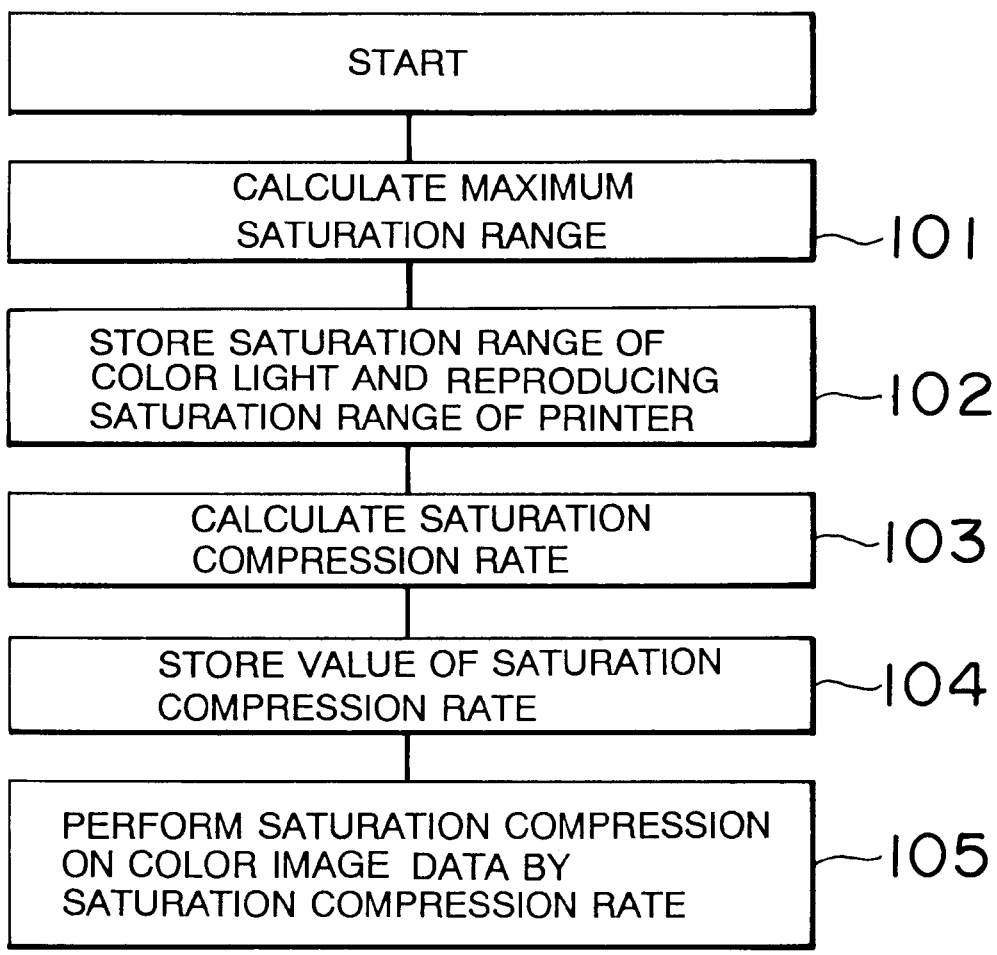
FIG. 10 is a flow chart for use in describing procedure of the compressing saturation processing section in the system shown in FIG. 5.

FIG. 10 is a flow chart showing the saturation compression procedure in the above mentioned system.

Figure 11:
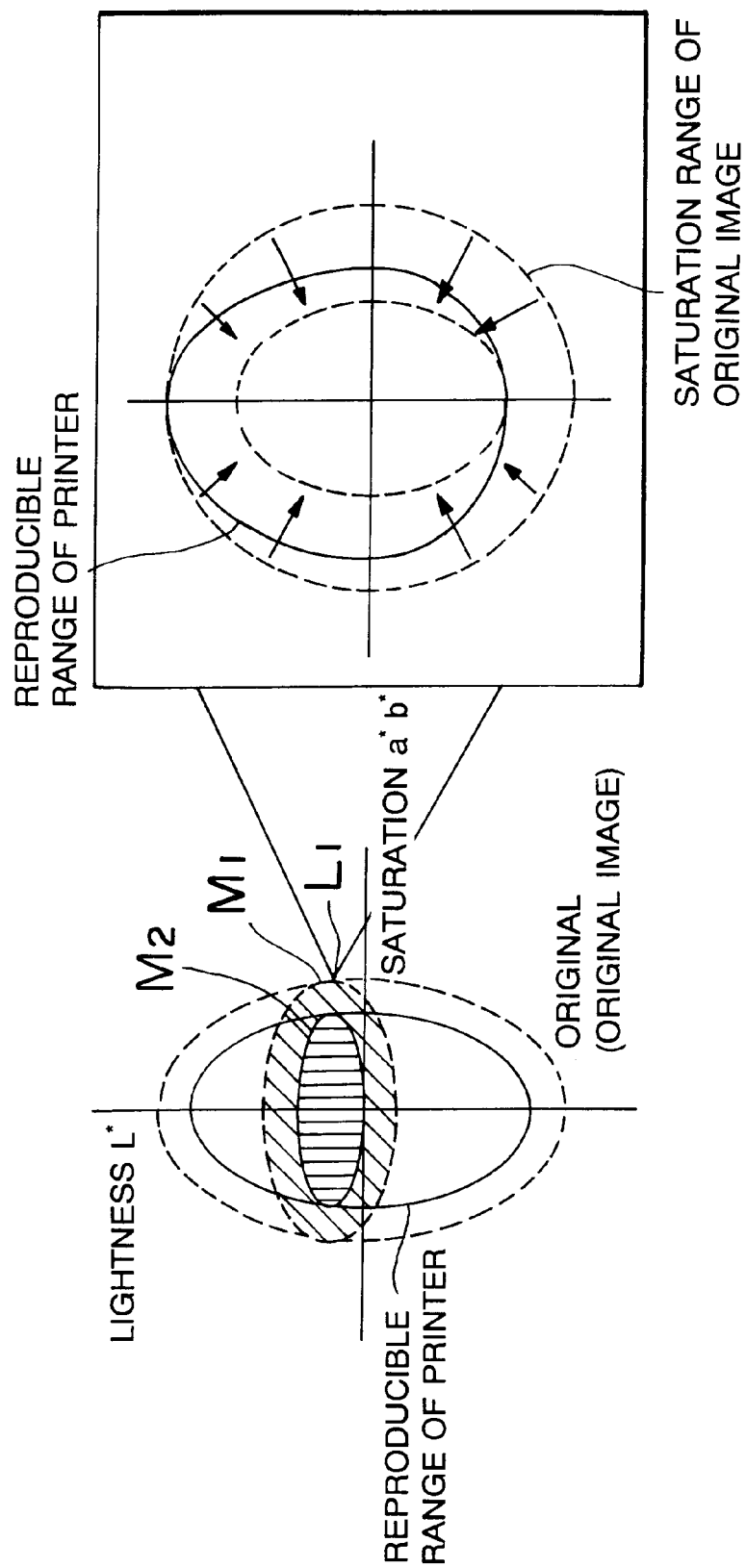
FIG. 11 is a typical drawing for use in describing a compressing saturation procedure shown in FIG. 10.

With regard to the spaces L* a* b* shown in FIG. 11, the lightness L* is set to the vertical axis. The lightness a* b* are set to a surface at right angles to the vertical axis.

First, the saturation range calculating section 1 calculates the saturation ranges of color light and the reproducing saturation ranges of the printer 56 as shown in FIG. 11 and then calculates the maximum saturation range covering the saturation ranges corresponding to each lightness (Step 101). For example, the saturation range calculating section 1 calculates a maximum saturation range M1 of color light and a saturation range M2 of the printer 56 in a case of the lightness range L1.

The saturation ranges of color light corresponding to each lightness are stored in the saturation range storing section 8 and the saturation ranges of the printer 56 corresponding to each lightness are stored in the reproducing saturation range storing section 9 (Step 102).

Next, according to the first data stored in the saturation range storing section 8 and the second data stored in the reproducing saturation range storing section 9, the compression rate calculating section 2 calculates the saturation compression rate by the following expression corresponding to each lightness (Step 103).

$$\text{saturation compression rate} = \frac{\text{maximum reproducing saturation range of printer}}{\text{maximum saturation range of color light}}$$

The saturation compression rate calculated by the compression rate calculating section 2 corresponding to each lightness are stored in the compression rate storing section 10 (Step 104). The compression arithmetic section 3 performs the saturation compression on the color image data by the saturation compression rate calculated by the compression rate calculating section 2 (Step 105).

Thus, the saturation ranges of color light corresponding to each lightness, the reproducing saturation ranges of the printer corresponding to each lightness, and the saturation compression rate corresponding to each lightness are produced. That is to say, before the saturation compression, the system is capable of keeping a color balance on the output image by performing the analogous compressing without damaging a saturation pattern taking the saturation ranges of color light and the reproducing saturation ranges of the output device into consideration.

The lightness transfer procedure of the system is now described hereinafter.

Figure 12:
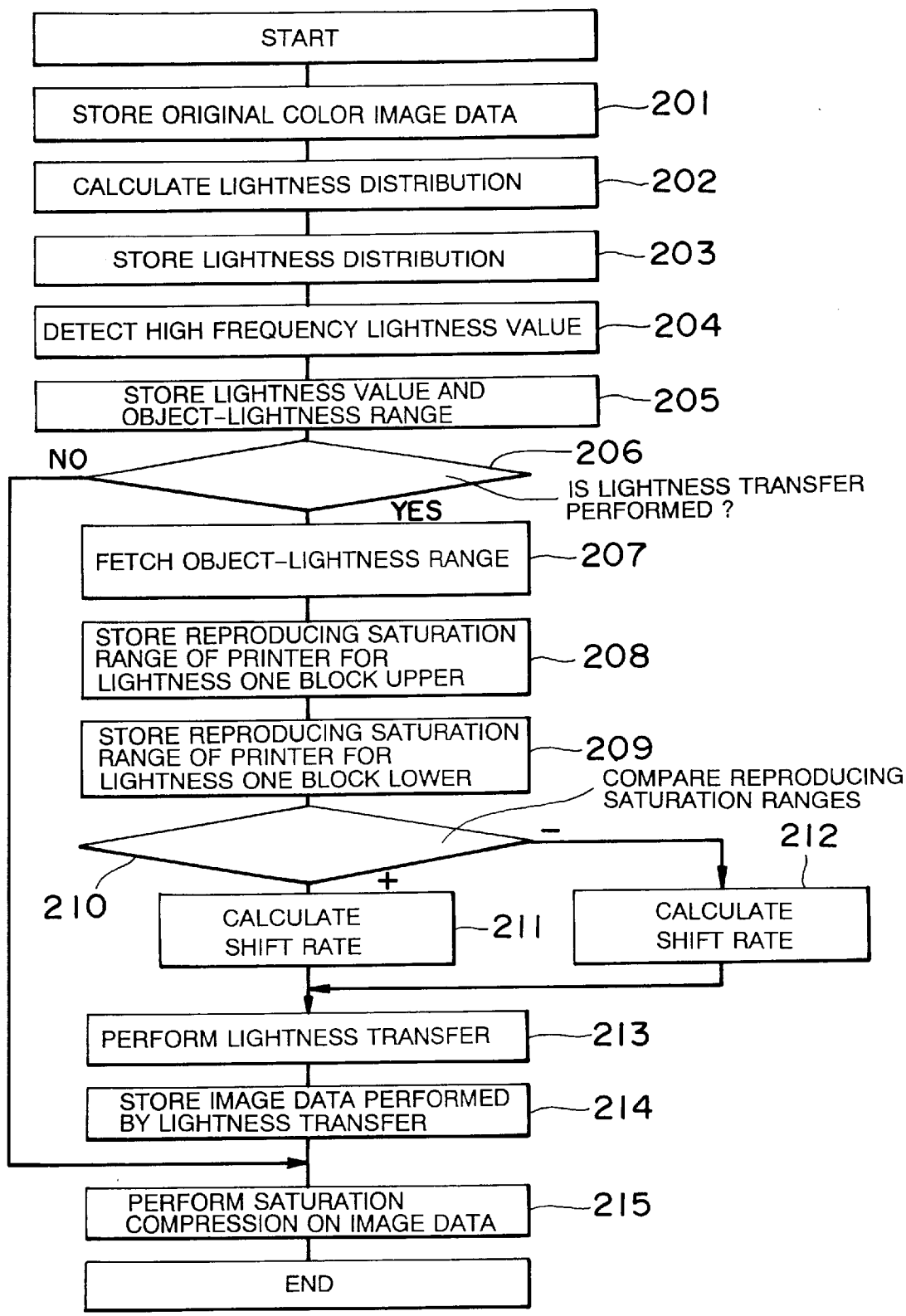
FIG. 12 is a flow chart for use in describing procedure of the transferring lightness processing section in the system shown in FIG. 5.

FIG. 12 is a flow chart of the lightness transfer procedure.

Figure 13:
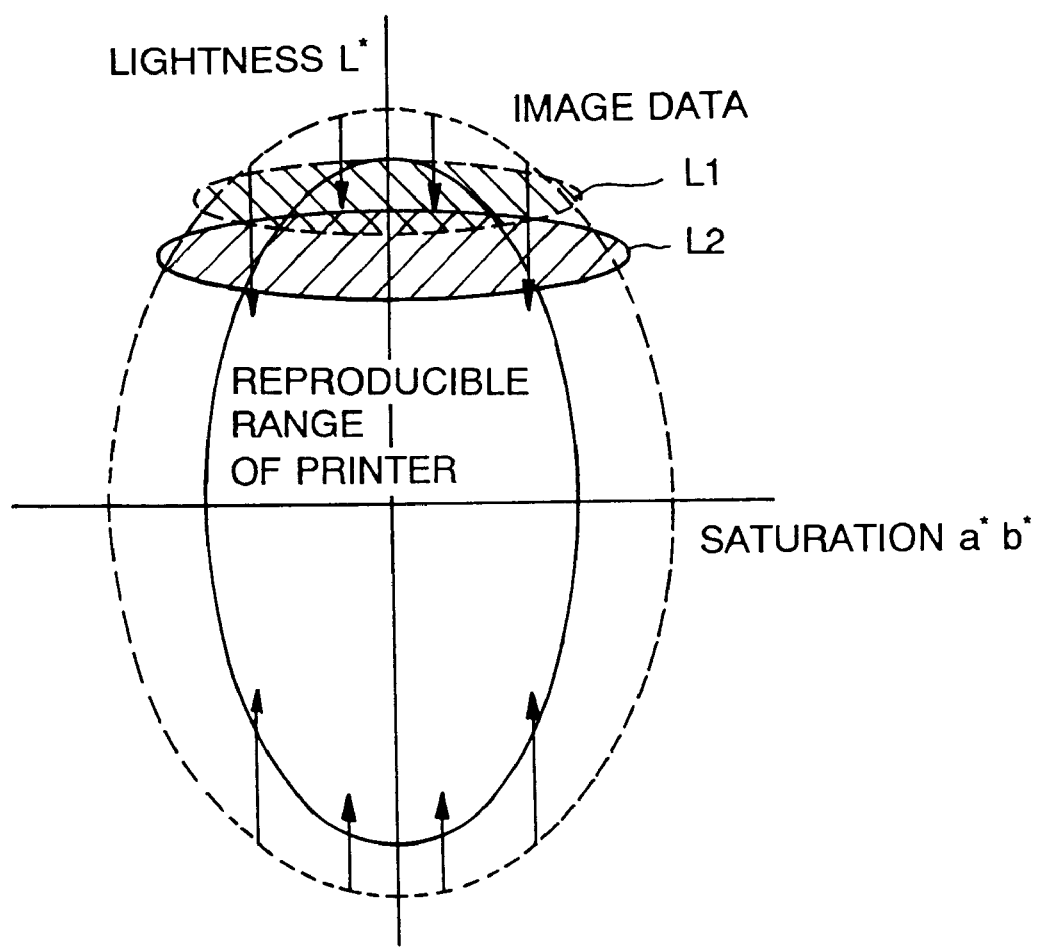
FIG. 13 is a typical drawing for use in describing the transferring lightness processing section shown in FIG. 12.

With regard to the spaces L* a* b* shown in FIG. 13, the lightness L* is set to a vertical axis and the lightness a* b* are set to a surface at right angles to the vertical axis.

First, the image data L* a* b* (original color image data) are stored in the image data storing section 11 (Step 201). The lightness distribution calculating section 4 calculates the distribution of the lightness (L*) to the whole image data of the image data L* a* b* from the image data storing section 11 (Step 201). As shown in FIG. 13, the lightness of the image data distributes, for example, to the lightness ranges L1 or L2. The result for output of the lightness distribution calculating section 4 is stored in the lightness distribution section 12 (Step 203).

According to the lightness distribution stored in the lightness distribution storing section 12 and the saturation compression rate stored in the compression rate storing section 10 corresponding to each lightness, the lightness discriminating section 5 determines whether the lightness transfer is performed or not.

The lightness discriminating section 5 performs the following procedure.

First, according to the lightness distribution stored in the lightness distribution storing section 12, the lightness detecting section 31 detects the high frequency lightness value, that is, a lightness value which is distributed much, and produces the lightness range having the high frequency lightness value and the lightness value disposed contiguous to the high frequency lightness value (Step 204). This lightness range is an object for discriminating the lightness and for transferring the lightness.

The lightness range produced by the lightness detecting section 31 is stored in the lightness storing section 33 (Step 205).

According to the lightness range stored in the lightness storing section 33 and the saturation compression rate stored in the compression rate storing section 10 corresponding to each lightness, the compression rate detecting section 32 detects whether the lightness transfer is performed or not (Step 206).

The compression rate detecting section 32 performs the lightness transfer (Flag "0") when the saturation compression rate is smaller than the predetermined threshold, and does not perform the lightness transfer (Flag "1") when the saturation compression rate is lager than the predetermined threshold. The compression rate detecting section 32 repeatedly performs the above mentioned process at the number of times which is the same to the number of lightness values stored in the lightness storing section 33.

When the lightness transfer is performed (Flag "0"), the lightness range having the high frequency lightness value and the lightness value disposed contiguous to the high frequency lightness value is stored in the lightness storing section 34 (Step 207).

The procedure of the lightness discriminating section 5 is described the above.

When the lightness discriminating section 5 discriminates that the lightness transfer is performed, that is, Flag "0", the lightness transfer rate calculating section 6 calculates the lightness transfer rate.

The procedure of the lightness transfer rate calculating section 6 will be described hereinafter.

First, according to the reproducing saturation range of the printer stored in the reproducing saturation range storing section 9, the reproducing saturation range storing section 40A stores the reproducing saturation range of the printer corresponding to a lightness range which is one block (1 unit) upper from the lightness range stored in the lightness storing section 34 (Step 208).

According to the reproducing saturation range of the printer stored in the reproducing saturation range storing section 9, the reproducing saturation range storing section 40B stores the reproducing saturation range of the printer corresponding to a lightness range which is one block lower from the lightness range stored in the lightness storing section 34 (Step 209).

The comparing section 41 compares the reproducing saturation range of printer stored in the reproducing saturation range storing section 40A with the reproducing saturation range of printer stored in the reproducing saturation range storing section 40B (Step 210).

The control section 42A calculate a shift rate of one block in a positive direction of the lightness in the object-lightness range stored in the lightness storing section 34 by the following expression when the reproducing saturation range of printer stored in the reproducing saturation range storing section 40A is larger than the reproducing saturation range in the reproduction range storing section 40B (Flag "0"), (Step 211).

$L^*$ after shifting =

$$\frac{\max - \min + \beta - \alpha}{\max - \min} \times L^* \text{ before shifting} + \frac{\alpha \max - \beta \min}{\max - \min}$$

where "max" is a maximum of the lightness range to be the subject; "min" is a minimum of the lightness range to be the subject; "(max+$\beta$)" is the maximum transfer value (shift value); (min+$\alpha$) is the minimum transfer value (shift value); "$\beta$" is the lightness unit×M wherein "M" is a constant of decimal place; and "$\alpha$" is the lightness unit×N wherein "N" is a constant of decimal place.

Though "M" and "N" are constants in spite of the value of the lightness, "M" and "N" may be fixed corresponding to each lightness. Though the shift rate is linearly calculated, the shift rate may be non-linearly calculated or a suitable transfer subject table may be previously prepared.

The calculated lightness transfer rate is stored in the lightness transfer rate storing section 13.

While, when the reproducing saturation range of the printer stored in the reproducing saturation range storing section 40B is larger than one stored in the reproducing saturation range storing section 40A (Flag "1"), the control section 42B calculates a shift rate of one block of the object-lightness in negative direction (−1 block) within the lightness transfer range stored in the lightness storing section 34 by substituting "−$\beta$" for above mentioned "+$\beta$" and substituting "−$\alpha$" for above mentioned "+$\alpha$" (Step 212).

Next, the lightness transfer section 7 performs the lightness transfer by the calculated lightness transfer rate on the lightness data within the image data stored in the image data storing section 11 wherein the lightness data are discriminated that the lightness transfer is performed (Step 213).

The image data storing section 14 then stores the image data performed by the lightness transfer one by one wherein the image data are to be outputted from the lightness transfer section 7 (Step 214).

The above mentioned procedures are performed at the times of the number of data L* a* b*.

Finally, the saturation compression arithmetic section 3 performs the saturation compression on the image data performed by the lightness transfer in the lightness transfer section 7 and then produces the final image data performed the color compensating procedure (Step 215).

When it is determined that the lightness transfer is not performed in Step 206, a jump to Step 215 takes place and the saturation compression arithmetic section 3 performs the saturation compression on the image data performed by the lightness transfer in the lightness transfer section 7 and then produces the final image data performed the color compensating procedure.

As mentioned above, this system performs the saturation compression after performing the lightness transfer for enlarging the reproducing saturation range when the reproducing saturation range of the printer has small lightness according to the lightness distribution of the input image data. Therefore, the system is capable of producing more vivid and beautiful output image with effectively using the reproducing color ranges of the output device.

Though the above description was made as regards reducing a calorimetric bungle of the printer, the method for reproducing color for the output device according to the present invention is able to reduce a calorimetric bungle between the original color image data and an image data of the display device. Furthermore, according to the present invention, the output result having suitable colors is also produced, for example, when the color image data are processed a color procedure on the display device to output the processed data from the printer.

What is claimed is:

1. A computer-implemented method of reproducing a color image of an original color image data comprising:

a saturation range calculating step, based on a saturation range of a color light in an original color image data and a reproducing saturation range of an output device, for calculating the maximum saturation range of said saturation range of said color light and the maximum reproducing saturation range of said reproducing saturation range of said output device, corresponding to each predetermined lightness;

a compression rate calculating step, in accordance with said maximum saturation range and said maximum reproducing saturation range of said output device corresponding to each predetermined lightness, for calculating a saturation compression rate to analogously compress said saturation range of said color light into said reproducing saturation range of the output device;

a compression arithmetic step for performing a saturation compression on said original color image data using said saturation compression rate calculated at said compression rate calculating step; and an output step of generating a reproduced color image based on said saturation compression performed at said compression arithmetic step.

2. A method according to claim 1, further comprising:

a lightness distribution calculating step for calculating a lightness distribution of said original color image data;

a lightness determining step, based on said lightness distribution calculated at said lightness distribution calculating step, for determining whether or not a lightness transfer is performed to transfer a first lightness range into a second lightness range, said first lightness range having a relatively small value of said reproducing saturation range of said output device, said second lightness range having a relatively large value of said reproducing saturation range of said output device;

a transfer rate calculating step for calculating a lightness transfer rate in accordance with said first and said second lightness range when determining that said lightness transfer is performed; and a lightness transferring step for performing a lightness transfer on said original color image data using said lightness transfer rate, and said compression arithmetic step for performing the saturation compression on said original color image data further using said lightness transfer performed at said lightness transferring step.

3. A method according to claim 1, wherein said saturation range calculating step includes a saturation range storing for storing said saturation range of said color light and said reproducing saturation range of said output device.

4. A method according to claim 2, wherein said lightness distribution calculation step includes a lightness distribution storing step for storing said lightness distribution, said transfer rate calculating step includes a lightness transfer rate storing step for storing said lightness transfer rate, and said lightness transfer step includes a color image data storing step for storing said color image data performed by said lightness transfer.

5. A method according to claim 2, wherein said lightness determining step includes:

a lightness detecting step for detecting an object-lightness range having a high frequency lightness value and the other lightness value disposed contiguous to said high frequency lightness value; and a compression rate detecting step, based on said object-lightness range detected through said lightness detecting step and said saturation compression rate calculated through said compression rate calculating step, for detecting whether or not said saturation compression rate is to be performed by said lightness transfer under a predetermined threshold value.

6. A method according to claim 5, wherein said compression rate detecting step includes a step for comparing said saturation compressing rate with said predetermined threshold value to determine whether or not said lightness transfer is performed corresponding to each lightness value included in said object-lightness range.

7. A method according to claim 2, wherein said transfer rate calculating step includes:

a shift direction determining step for determining whether the lightness range of said lightness distribution is shifted in a positive direction or in a negative direction; and a shift rate calculating step for producing said lightness transfer rate by calculating a shift rate in said shift direction determined through said shift direction determining step according to the maximum value and the minimum value in said lightness values.

8. A method according to claim 7, wherein said shift direction determining step includes a step for determining a direction to shift said lightness range by comparing an upper reproducing saturation range with a lower reproducing saturation range, said upper reproducing saturation range corresponding to one lightness range which is one unit from said lightness range, said lower reproducing saturation range corresponding to other lightness range which is one unit lower from said lightness range.

9. An apparatus for reproducing a color image of an original color image data comprising:

saturation range calculating means for calculating a saturation range of a color light in an original color image data and a reproducing saturation range of an output device, and for calculating the maximum saturation range of said saturation range of said color light range and the maximum reproducing saturation range of said reproducing saturation range of said output device, corresponding to each predetermined lightness;

compression rate calculating means, based on said maximum saturation range and said maximum reproducing saturation range of said output device corresponding to each predetermined lightness calculated by said saturation range calculating means, for calculating a saturation compression rate to analogously compress said saturation range of said color light into said reproducing saturation range of the output device;

compression arithmetic means for performing a saturation compression on said original color image data using said saturation compression rate calculated by said compression rate calculating means; and an output device to generate a reproduced color image based on said saturation compression performed by said compression arithmetic means.

10. An apparatus according to claim 9, further comprising:

lightness distribution calculating means for calculating a lightness distribution of said original color image data;

lightness determining means, based on said lightness distribution calculated by said lightness distribution calculating means, for determining whether or not a lightness transfer is performed to transfer a first lightness range into a second lightness range, said first lightness range having a relatively small value of said reproducing saturation range of said output device, said second lightness range having a relatively large value of said reproducing saturation range of said output device;

transfer rate calculating means for calculating a lightness transfer rate in accordance with said first and said second lightness range when determining that said lightness transfer is performed; and lightness transferring means for performing a lightness transfer on said original color image data using said lightness transfer rate, and said compression arithmetic means for performing the saturation compression on said original color image data further using said lightness transfer performed by said lightness transferring means.

11. An apparatus according to claim 9, wherein said saturation range calculating means includes saturation range storing means for storing said saturation range of said color light; and reproducing saturation range storing means for storing said reproducing saturation range of said output device.

12. An apparatus according to claim 10, further comprising:

first image data storing means for storing said original image data;

lightness distribution storing means for storing said lightness distribution;

lightness transfer rate storing means for storing said lightness transfer rate; and second image data storing means for storing said color image data performed by said lightness transfer in said lightness transfer means.

13. An apparatus according to claim 10, wherein said lightness determining means includes:

lightness detecting means for detecting an object-lightness range having a high frequency lightness value and another lightness value disposed contiguous to said high frequency lightness value; and compression rate detecting means, based on said object-lightness range detected by said lightness detecting means and said saturation compression rate calculated by said compression rate calculating means, for detecting whether or not said saturation compression rate is to be performed by said lightness transfer under a predetermined threshold value.

14. An apparatus according to claim 13, wherein said compression rate detecting means includes means for comparing said saturation compressing rate with said predetermined threshold value to determine whether or not said lightness transfer is performed corresponding to each lightness value included in said object-lightness range.

15. An apparatus according to claim 10, wherein said transfer rate calculating means includes:

shift direction determining means for determining whether the lightness range of said lightness distribution is shifted in a positive direction or in a negative direction; and shift rate calculating means for producing said lightness transfer rate by calculating a shift rate in said shift direction determined by said shift direction determining means according to the maximum value and the minimum value in said lightness values.

16. An apparatus according to claim 15, wherein said shift direction determining means includes means for determining a direction to shift said lightness range by comparing an upper reproducing saturation range with a lower reproducing saturation range, said upper reproducing saturation range corresponding to one lightness range which is one section upper from said lightness range, said lower reproducing saturation range corresponding to other lightness range which is one unit lower from said lightness range.

* * * * *